US012689563B2

(12) United States Patent
Giust et al.

(10) Patent No.: US 12,689,563 B2
(45) Date of Patent: Jul. 21, 2026

(54) METHOD TO MONITOR ACCURACY OF ANALYTICS IN A MOBILE COMMUNICATION SYSTEM

(71) Applicant: Nokia Technologies Oy, Espoo (FI)

(72) Inventors: Fabio Giust, Munich (DE); Guillermo Rodriguez-Navas, Kfar Sava (IL); Evgeni Berenstein, Kfar Sava (IL)

(73) Assignee: Nokia Technologies Oy, Espoo (FI)

( * ) Notice: Subject to any disclaimer, the term of this patent is extended or adjusted under 35 U.S.C. 154(b) by 274 days.

(21) Appl. No.: 18/446,584

(22) Filed: Aug. 9, 2023

(65) Prior Publication Data

US 2024/0056365 A1 Feb. 15, 2024

(30) Foreign Application Priority Data

Aug. 9, 2022 (EP) .................................... 22189527

(51) Int. Cl.
| | |
|---|---|
| *H04L 41/16* | (2022.01) |
| *H04L 41/50* | (2022.01) |
| *H04L 43/00* | (2022.01) |
| *H04W 24/08* | (2009.01) |

(52) U.S. Cl.
CPC .............. *H04L 41/16* (2013.01); *H04L 41/50* (2013.01); *H04L 43/00* (2013.01); *H04W 24/08* (2013.01)

(58) Field of Classification Search
CPC ......... H04L 41/16; H04L 41/50; H04L 43/00; H04W 24/08
See application file for complete search history.

(56) References Cited

U.S. PATENT DOCUMENTS

| | | | | |
|---|---|---|---|---|
| 2022/0108214 A1* | 4/2022 | Lee | ........................ | H04W 48/18 |
| 2023/0262433 A1* | 8/2023 | Potluri | .................. | H04W 48/16 |
| | | | | 455/414.3 |
| 2023/0262498 A1 | 8/2023 | Khare et al. | | |

(Continued)

FOREIGN PATENT DOCUMENTS

| | | | | |
|---|---|---|---|---|
| WO | 2021/004859 A1 | 1/2021 | | |
| WO | 2022/164225 A1 | 8/2022 | | |
| WO | WO-2023179886 A1 * | 9/2023 | ............. | G06N 20/00 |

OTHER PUBLICATIONS

"KI #1, Sol#34: Update to solve ENs", SA WG2 Meeting #151E, S2-2205080, Agenda: 9.23, Nokia, May 16-20, 2022, pp. 1-5.

(Continued)

*Primary Examiner* — Angela Widhalm De Rodriguez
(74) *Attorney, Agent, or Firm* — Nokia Technologies Oy

(57) ABSTRACT

An apparatus, in a model training related network element, is provided, the apparatus comprising: at least one processor and at least one memory including computer program code, the at least one memory and the computer program code configured to, with the at least one processor, cause the apparatus at least to perform: receiving a monitoring correlation identifier, subscribing to analytics related information provided by an analytics network element from a storage network element based on the received monitoring correlation identifier, retrieving the analytics related information provided by the analytics network element from the storage network element, and calculating the accuracy of the analytics based on the retrieved analytics related information.

4 Claims, 6 Drawing Sheets

(56)                    References Cited

U.S. PATENT DOCUMENTS

2025/0217701 A1 *    7/2025  Karampatsis ......... G06N 20/00

OTHER PUBLICATIONS

"3rd Generation Partnership Project; Technical Specification Group Services and System Aspects; Architecture enhancements for 5G System (5GS) to support network data analytics services (Release 17)", 3GPP TS 23.288, V17.5.0, Jun. 2022, pp. 1-207.
Extended European Search Report received for corresponding European Patent Application No. 22189527.9, dated Jan. 23, 2023, 8 pages.
"3rd Generation Partnership Project; Technical Specification Group Services and System Aspects; Study of Enablers for Network Automation for 5G 5G System (5GS); Phase 3 (Release 18)", 3GPP TR 23.700-81, V0.3.0, May 2022, pp. 1-191.

* cited by examiner

3

METHOD TO MONITOR ACCURACY OF ANALYTICS IN A MOBILE COMMUNICATION SYSTEM

CROSS-REFERENCE TO RELATED APPLICATIONS

This patent application claims the benefit of priority of European Patent Office Patent Application No. 22189527.9 filed Aug. 9, 2022, the contents of which are hereby incorporated by reference as if reproduced in their entirety.

FIELD OF THE INVENTION

The present invention relates to an apparatus, a method and a computer program product for monitoring accuracy of analytics in a mobile communication system.

BACKGROUND

The following meanings for the abbreviations used in this specification apply:
ADRF Analytics Data Repository Function
AnLF Analytics Logical Function
DCCF Data Collection Coordination Function
MFAF Messaging Framework Adaptor Function
ML Machine Learning
MTLF ML Model Training Logical Function
NF Network Function
NFc Network Function Consumer (of a Service)
NFp Network Function Producer (of a Service)
NWDAF Network Data Analytics Function
URI Uniform Resource Identifier Example embodiments, although not limited to this, relate to network analytics. For example, 3GPP TS 23.288 defines the Network Data Analytics Function (NWDAF) as the 5G core network function able to generate analytics. Since Rel. 17 of the specifications, NWDAF is decomposed in an Analytics logical function (AnLF) and a Model Training logical function (MTLF). The Analytics logical function (AnLF) is a logical function in the NWDAF, which performs inference, derives analytics information (i.e. derives statistics and/or predictions based on Analytics Consumer request) and exposes analytics service i.e. Nnwdaf_AnalyticsSubscription or Nnwdaf_AnalyticsInfo. The Model Training logical function (MTLF) is a logical function in NWDAF, which trains Machine Learning (ML) models and exposes training services (e.g., providing trained ML model) i.e., Nnwdaf_MLModelProvision and Nnwdaf_MLModelInfo services.

The Analytics Data Repository Function offers services that enable a consumer to store and retrieve data and analytics.

Data may be stored in the ADRF by a consumer sending the ADRF an Nadrf_DataManagement_StorageRequest containing the data or analytics to be stored, or by a consumer sending the ADRF an Nadrf_DataManagement_StorageSubscriptionRequest requesting that the ADRF subscribes to receive data or analytics for storage. The ADRF then subscribes for data or analytics, providing ADRF Notification Address (+Notification Correlation ID). Analytics or Data are subsequently provided as notifications.

Data may be retrieved from the ADRF by a consumer sending an Nadrf_DataManagement_RetrievalRequest request to the ADRF to retrieve data or analytics for a specified data or analytics collection time window, or by a consumer sending an Nadrf_DataManagement_Retrieval- Subscribe request to the ADRF to retrieve data or analytics for a specified data or analytics collection time window.

In this situation, the accuracy of the analytics should be as high as possible.

SUMMARY

Example embodiments address this situation aim to improve the correctness of NWDAF analytics.

According to a first aspect, an apparatus, in a model training related network element, is provided, the apparatus comprising: at least one processor and at least one memory including computer program code, the at least one memory and the computer program code configured to, with the at least one processor, cause the apparatus at least to perform: receiving a monitoring correlation identifier, subscribing to analytics related information provided by an analytics network element from a storage network element based on the received monitoring correlation identifier, retrieving the analytics related information provided by the analytics network element from the storage network element, and calculating the accuracy of the analytics based on the retrieved analytics related information.

According to a second aspect, a method, for use in a model training related network element, is provided, the method comprising: receiving a monitoring correlation identifier, subscribing to analytics related information provided by an analytics network element from a storage network element based on the received monitoring correlation identifier, retrieving the analytics related information provided by the analytics network element from the storage network element, and calculating the accuracy of the analytics based on the retrieved analytics related information.

The first and second aspects may be modified as follows. It may be determined, based on the calculated accuracy of the analytics, whether a model used for providing the analytics is to be amended.

The model may be established, the model may be amended in case it is determined that the model is to be amended, and the model may be provided to the analytics network element.

The model may be established by training, and the model may be amended by re-training.

The analytics related information may comprise data used for predictions and the predictions.

A storage network element may be requested to collect the analytics related information provided by the analytics network element.

An accuracy report may be created based on the calculated accuracy and the accuracy report may be provided to a network function.

According to a third aspect, an apparatus, in a storage network element is provided, the apparatus comprising: at least one processor and at least one memory including computer program code, the at least one memory and the computer program code configured to, with the at least one processor, cause the apparatus at least to perform: storing analytics related information provided by an analytics network element based on a monitoring correlation identifier, and providing the stored analytics related information to a model training related network element.

According to a fourth aspect, a method, for use in a storage network element is provided, the method comprising: storing analytics related information provided by an analytics network element based on a monitoring correlation identifier and providing the stored analytics related information to a model training related network element.

The third and fourth aspects may be modified as follows.

A request from the analytics network element for storing and providing the analytics related information may be received, wherein the request includes the monitoring correlation identifier.

A request from the model training related network element for storing and providing the analytics related information may be received, wherein the request includes the monitoring correlation identifier.

According to a fifth aspect, an apparatus, in an analytics network element, is provided, the apparatus comprising: at least one processor and at least one memory including computer program code, the at least one memory and the computer program code configured to, with the at least one processor, cause the apparatus at least to perform: providing analytics, and requesting a storage network element to collect analytics related information used for providing the analytics based on a monitoring correlation identifier associated to the analytics related information.

According to a sixth aspect, a method, for use in an analytics network element, is provided, the method comprising: providing analytics, and requesting a storage network element to collect analytics related information used for providing the analytics based on a monitoring correlation identifier associated to the analytics related information.

The fifth and the sixth aspects may be modified as follows.

The storage network element may be requested to collect the analytics related information by sending a request to a model training related network element including the monitoring correlation identifier.

An accuracy report from the model training related network element may be received.

According to an eleventh aspect, a computer program product is provided which comprises code means for performing a method according to any one of the second, fourth and sixth aspects and/or their modifications when run on a processing means or module. The computer program product may be embodied on a computer-readable medium, and/or the computer program product may be directly loadable into the internal memory of the computer and/or transmittable via a network by means of at least one of upload, download and push procedures.

According to a ninth aspect, an apparatus is provided which comprises means for receiving a monitoring correlation identifier, means for subscribing to analytics related information provided by an analytics network element from a storage network element based on the received monitoring correlation identifier, means for retrieving the analytics related information provided by the analytics network element from the storage network element, and means for calculating the accuracy of the analytics based on the retrieved analytics related information.

According to a tenth aspect, an apparatus is provided which comprises means for storing analytics related information provided by an analytics network element based on a monitoring correlation identifier and means for providing the stored analytics related information to a model training related network element.

According to an eleventh aspect, an apparatus is provided which comprises means for providing analytics and means for requesting a storage network element to collect analytics related information used for providing the analytics based on a monitoring correlation identifier associated to the analytics related information.

BRIEF DESCRIPTION OF THE DRAWINGS

These and other objects, features, details and advantages will become more fully apparent from the following detailed description of example embodiments, which is to be taken in conjunction with the appended drawings, in which.

DETAILED DESCRIPTION OF EXAMPLE EMBODIMENTS

In the following, description will be made to example embodiments. It is to be understood, however, that the description is given by way of example only, and that the described example embodiments are by no means to be understood as limiting the present invention thereto.

Before describing example embodiment, in the following, problems of the prior art are discussed in some more detail.

As mentioned above, some example embodiments aim to improve the correctness of NWDAF analytics.

In this connection, it is noted that release 17 TS 23.288 defines that a consumer requesting analytics can specify a "Preferred Accuracy Level" (low, medium, high or highest), and the NWDAF can provide a "probability assertion" expressing the Confidence in its predictions. The probability assertion is provided to the consumer with the analytics predictions and does not compare provided predictions with actual future outcomes (which have yet to occur). When NWDAF predicts something for the future, it does not monitor/collect information about the occurrence of the actual event, so it cannot compare the true observed event with its corresponding previous predictions.

To compute the accuracy of analytics, the performance of the ML model is monitored and in case the performance is not sufficient, re-training of the model is re-triggered. Depending on the use case, such operations may require high computational power and large storage space, and AnLF might not fulfil such requirements. In particular, it is proposed to let MLTF to execute the ML model monitoring, leveraging the ADRF to store the necessary analytics and data that MTLF uses to compute the accuracy.

According to some example embodiments, the monitoring task is evolved to ADRF and MTLF, not AnLF, as the latter should be kept as lightweight as possible, in order for it to be deployed in environments with low computing capabilities.

In the following, a general overview of some example embodiments is described by referring to FIGS. 1A, 1B, 2A, 2B, 3A and 3B.

Figure 1A:
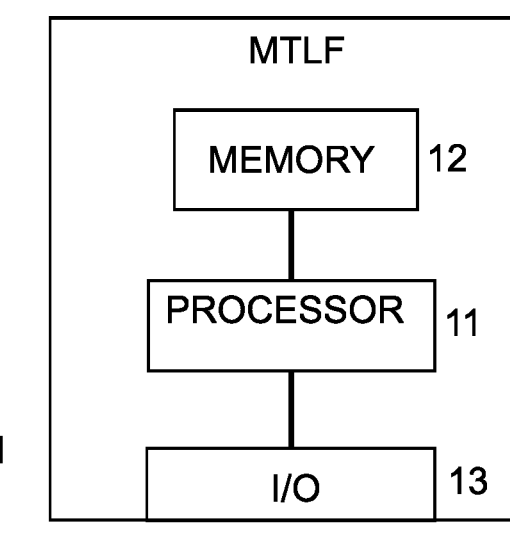
FIG. 1A shows a MTLF 1 according to an example embodiment.
Figure 1B:
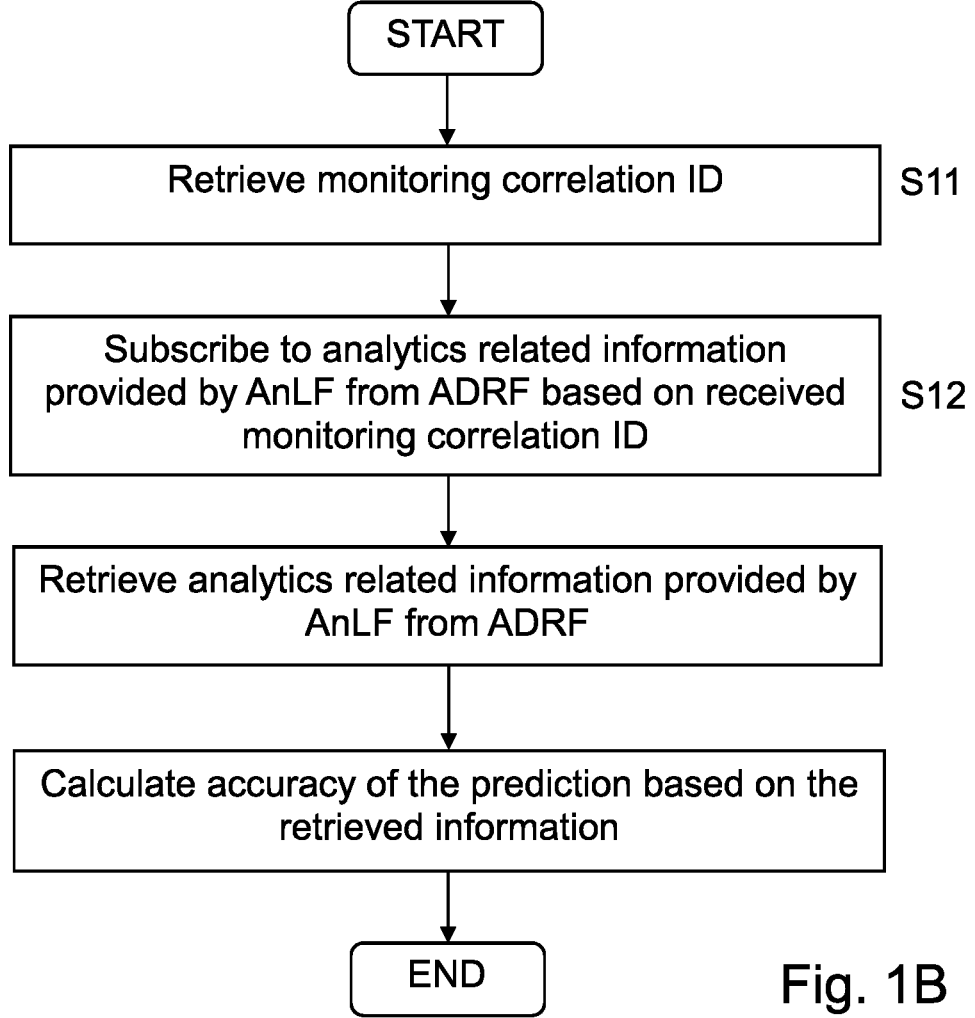
FIG. 1B shows a procedure carried out by the MTLF 1 according to the example embodiment.

FIG. 1A shows a MTLF 1 according to the present example embodiment. The MTLF 1 is an example for an apparatus, which could be or be a part of a network element which carries out a model training logical function (MTLF) of a network data analytics function (NWDAF), for example. A procedure carried out by the MTLF 1 is illustrated in FIG. 1B. The MTLF 1 shown in FIG. 1A comprises at least one processor 11 and at least one memory 12 including computer program code. The at least one processor 11, with the at least one memory 12 and the computer program code, is configured to cause the apparatus to perform: receiving a monitoring correlation identifier (S11 in FIG. 1B), subscribing to analytics related information provided by an analytics network element (e.g., AnLF 3 shown in FIG. 3A) from a storage network element (e.g., ADRF 2 shown in FIG. 2A) based on the received monitoring correlation identifier (S12 in FIG. 1B), retrieving the analytics related information provided by the analytics network element from the storage network element (S13 in FIG. 1B), and calculating the accuracy of the analytics based on the retrieved analytics related information (S14 in FIG. 1B).

Figure 2A:
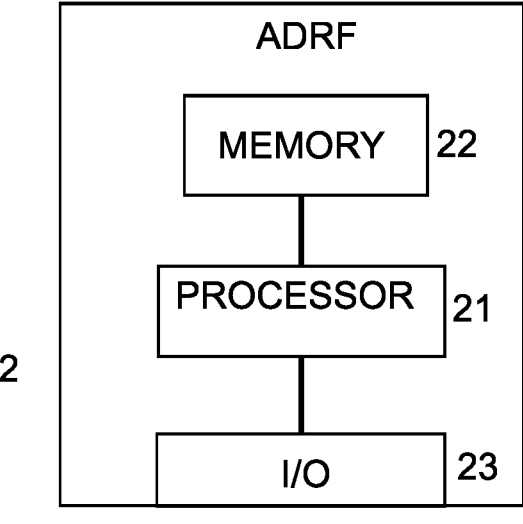
FIG. 2A shows an ADRF 2 according to an example embodiment.
Figure 2B:
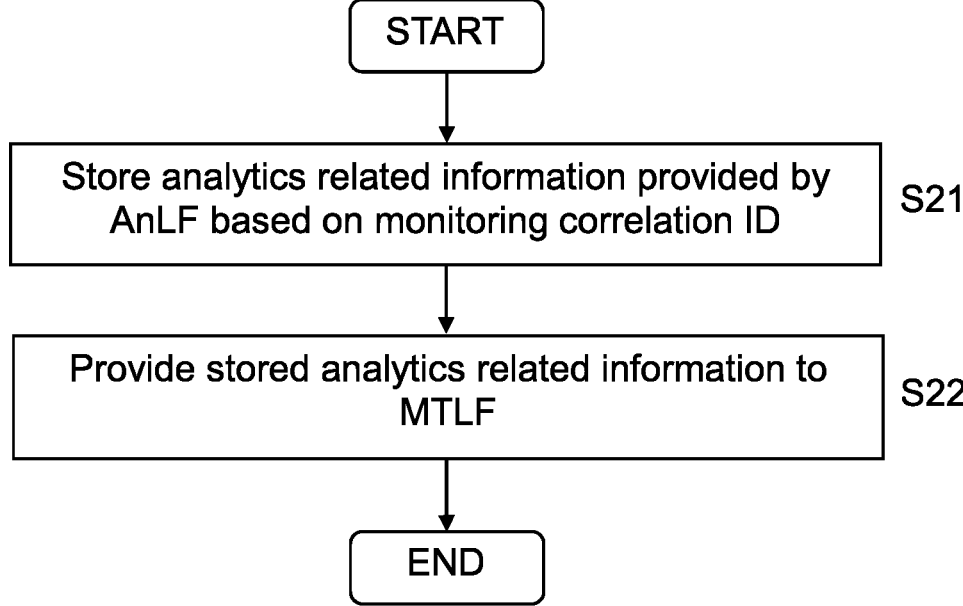
FIG. 2B shows a procedure carried out by the ADRF 2 according to the example embodiment.

FIG. 2A shows an ADRF 2 according to the present example embodiment. The ADRF 2 is an example for an apparatus, which could be or be a part of a network storage element which carries out an analytics data repository function (ADRF), for example. A procedure carried out by the ADRF 2 is illustrated in FIG. 2B. The ADRF 2 shown in FIG. 2A comprises at least one processor 21 and at least one memory 22 including computer program code. The at least one processor 21, with the at least one memory 22 and the computer program code, is configured to cause the apparatus to perform: storing analytics related information provided by an analytics network element (e.g., AnLF 3 shown in FIG. 3A) based on a monitoring correlation identifier (S21 in FIG. 2B), and providing the stored information concerning the analytics to a model training related network element (e.g., MTLF 1 shown in FIG. 1A) (S22 in FIG. 2B).

Figure 3A:
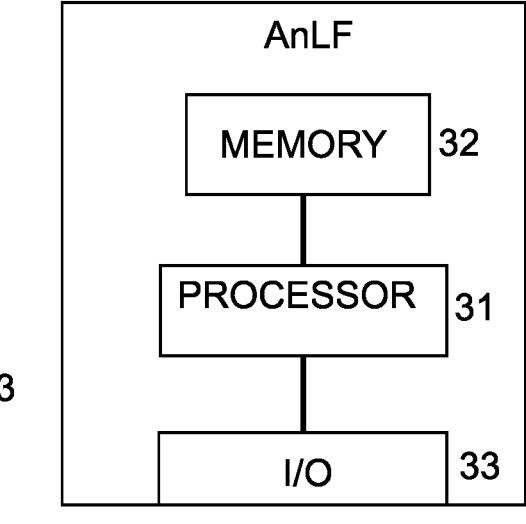
FIG. 3A shows an AnLF 3 according to an example embodiment.
Figure 3B:
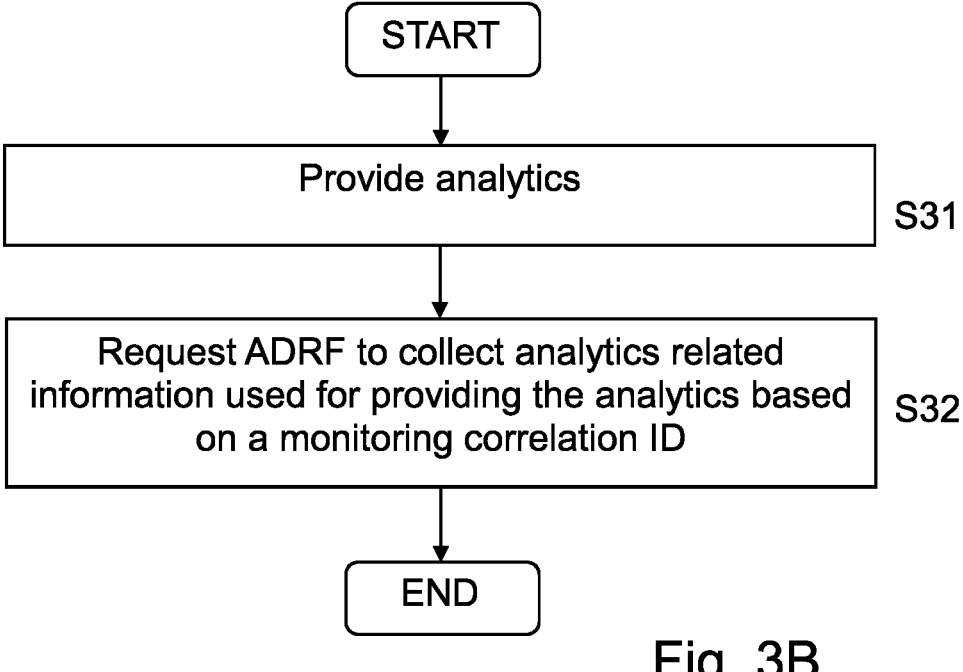
FIG. 3B shows a procedure carried out by the AnLF 3 according to the example embodiment.

FIG. 3A shows an AnLF 3 as an example for an apparatus performing an analytics logical function (AnLF) of a network data analytics function (NWDAF), for example. A procedure carried out by the AnLF 3 is shown in FIG. 3B. The AnLF 3 shown in FIG. 3A comprises at least one processor 31 and at least one memory 32 including computer program code. The at least one processor 31, with the at least one memory 32 and the computer program code, is configured to cause the apparatus to perform: providing analytics (S31 in FIG. 3B), and requesting a storage network element (e.g., ADRF 2 shown in FIG. 2A) to collect analytics related information used for providing the analytics based on a monitoring correlation identifier associated to the analytics related information.

Thus, according to example embodiments, it is possible that the MTLF determines the accuracy of analytics (predictions) provided by the AnLF, namely by letting a network storage element (e.g., ADRF) storing the necessary information based on which the accuracy can be determined.

Thus, the accuracy of the analytics can be improved.

It is noted that accuracy is computed comparing a model's output with some test data. In the context of some example embodiments, test data is called also "ground truth", i.e., data that represent events that have actually happened. Hence, the analytics related information mentioned above may include test data, for example.

For example, the analytics related information mentioned above may comprise data used for predictions and the predictions. It is noted that in context of some example embodiments, a standard system is considered in which "Analytics" are defined as a set of output information (carefully defined in the standard specification), being them referred to as "statistics" if they are computed over past events, or "predictions" if computed over future events yet to happen. Both types of analytics require some input data, which is the same in nature for both types. It is not really meaningful to compute accuracy over statistics-type analytics, whereas it is important to do it for predictions.

The apparatuses 1 to 3 shown in FIGS. 1A, 2A and, 3A may comprise more components than described above, and may further comprise I/O units 13, 23 and 33, which are capable of transmitting to and receiving from other network elements.

In the following, the procedures described above are described in the following by referring to some further detailed embodiments.

According to some example embodiments, accuracy of NWDAF analytics is monitored, in which the ADRF is used to store the data used for the predictions and the data used to determine the ground truth, and the MLTF retrieves predictions and data and computes the accuracy.

Ground truth in this connection is information that is known to be real or true, provided by direct observation and measurement (i.e., empirical evidence) as opposed to information provided by inference.

In the following, two embodiments, embodiments 1 and 2, are described. At first, a basic overview over both embodiments is given.

Embodiment 1 involves the AnLF as well, and it develops according to the following processes:
1. The NWDAF with AnLF (in short AnLF) performing the analytics
   a. sends a requests to a repository (ADRF) accessible by the NWDAF with MTLF (in short MTLF) to obtain data used for the analytics, the request including an indication to tag the obtained data with a Monitoring Correlation ID.
2. The ADRF subscribes to data collection as per the request from AnLF and stores the data including the TAG, i.e., the Monitoring Correlation ID
3. The MTLF
   a. Retrieves from the ADRF data tagged with the Monitoring Correlation ID
   b. based on the retrieved data calculates accuracy of the prediction of an analytics report generated by the AnLF
   c. determines whether to perform model re-training based on the calculated accuracy of the prediction Embodiment 2 does not involve the AnLF, and it develops according to the following processes:
1. the MTLF
   a. provides an ML model to an AnLF in response to a request from the AnLF
   b. requests the ADRF to collect data corresponding to analytics generated based on the provided ML model
   c. retrieves from the ADRF the data corresponding to the analytics
   d. based on the retrieved data calculates accuracy of the prediction
   e. determines whether to perform model re-training based on the calculated accuracy.
2. The ADRF subscribes to data collection as per the request from MTLF and stores the data including the TAG, i.e., the Monitoring Correlation ID.

In the following, a "NWDAF containing MTLF" is simply referred to as "MTLF" only, and a "NWDAF containing AnLF" is simply referred to as "AnLF" only.

Computing the accuracy of analytics, is a task of performance monitoring of the ML model, and in case the performance is not appropriate for the Model's intended purpose and expected behavior, re-training is triggered. Depending on the use case, such operations may require high computational power and large storage space, and AnLF might not fulfil such requirements.

In particular, it is proposed to let MTLF to execute the ML model performance monitoring, leveraging the ADRF to store the necessary analytics and data that MTLF uses to compute the accuracy.

Also, this solution proposes to enable the MTLF (NWDAF containing MTLF) to determine the actual outcome of a prediction, so that it can either report in an accuracy report the outcome to the consumer so the consumer can compare the outcome with the previously provided prediction; or compare the outcome with the previous prediction to generate an accuracy report which the MTLF provides to the consumer via AnLF.

The format of the accuracy report depends on the use case and analytics ID. In general, an accuracy value in given range, e.g., 1 to 10 may be defined.

The MTLF (NWDAF containing MTLF) uses the accuracy information to further fine-tune the model it is using (e.g., trigger model re-training, adjust data sources for the model training and the analytics generation).

As mentioned above, according to example embodiments, it is proposed to execute the monitoring in two embodiments:

At first, embodiment 1 is described in more detail. According to embodiment 1, the monitoring is triggered by AnLF, e.g., after receiving an analytics request from an Analytics consumer that requires also an accuracy report. In this alternative, AnLF instruments the ADRF to collect analytics and data after a prediction has been made. AnLF indicates to MTLF to retrieve the stored data, so that it can learn about actual outcomes, compare them with the predicted data, and generate an accuracy report.

Figure 4:
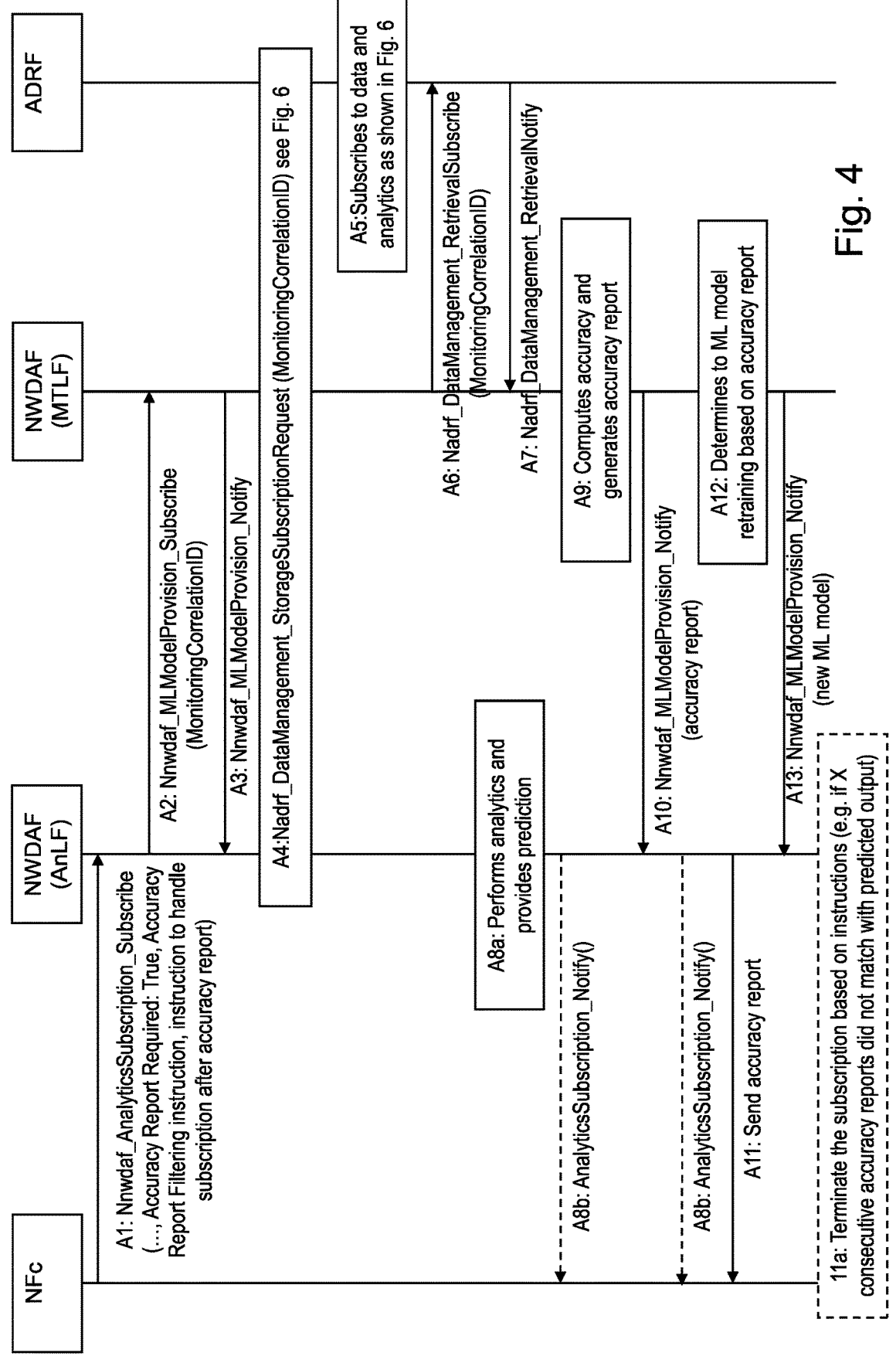
FIG. 4 illustrates a procedure for measuring and reporting accuracy of NWDAF analytics initiated by AnLF according to an embodiment 1.

FIG. 4 illustrates the procedure for measuring and reporting accuracy of NWDAF analytics initiated by AnLF according to embodiment 1.

In process A1, the (consumer) NF (also referred to as NFc) sends Nnwdaf_AnalyticsSubscription_Subscribe request to an NWDAF containing AnLF with a flag indicating that it is interested in receiving an accuracy report along with the analytics (prediction) report. The NFc also provides a callback URI to receive the accuracy report. The NFc may also send separate processing and filtering instructions for the accuracy report(s) (e.g. to club or filter the accuracy reports). The NFc may also send instructions to NWDAF on how to handle the subscription after having generating accuracy report. For example, the instructions may specify that if three consecutive predictions are wrong, the NWDAF subscription must be terminated, and a termination notification will be sent to the NFc.

In process A2, the AnLF (NWDAF containing AnLF) requests an ML model from the appropriate NWDAF containing MTLF, including the MonitoringCorrelationID parameter, needed by MTLF to execute the accuracy monitoring operations.

In process A3, the MLTF (NWDAF containing MLTF) provides the ML model to the AnLF as per current specifications.

In process A4, the AnLF (NWDAF containing AnLF) requests ADRF to subscribe for the collection of the analytics and data that correspond to the analytics requested by the NFc in process A1. AnLF uses the procedures as described later by referring to FIG. 6 (i.e., procedures as defined in Clause 6.2B.3 of TS 23.288), including the MonitoringCorrelationID.

In process A5, the ADRF executes the operations as described later by referring to FIG. 6 to subscribe to the analytics and data that correspond to the analytics requested by the NFc in process A1. ADRF stores the notifications and tags the received data using the MonitoringCorrelationID.

In process A6, the MLTF (NWDAF containing MLTF) subscribes to ADRF to retrieve all data tagged with the MonitoringCorrelationID received from the AnLF.

In process A7, the MLTF (NWDAF containing MLTF) receives the data from the ADRF.

In processes A8a-b (which can be executed after process A3), the NWDAF AnLF generates the predictions and provides them to the NFc.

In process A9, based on the collected analytics and data, the MLTF computes the accuracy using the predictions and the actual measured data observed at the time for which the prediction had been made.

In process A10, an accuracy report is sent to the AnLF after the events have occurred that were needed for the verification of the predictions. The accuracy report is sent in an MLModelProvision notification from MTLF.

In processes A11-11a, the accuracy report is sent to the consumer. The accuracy report may be sent in a separate notification from AnLF to NFc or it can be clubbed with the next analytics notification sending predictions of future events. Besides, the accuracy report is used as exemplary trigger to execute the monitoring, but it can be started by other means, eg., based on operator's explicit instruction or others. The frequency of the accuracy notification may be controlled via the filtering/reporting instruction(s) given in the subscribe request in process A1. Optionally, if, in step 1, an instruction was received on how to handle the subscription after having terminated the accuracy report, the NWDAF executes such instruction. For example, NWDAF terminates the subscription if three consecutive accuracy reports are below a given threshold (e.g. "no match") by sending a termination request.

In process A12, based on the computed accuracy, MLTF may decide to re-train the ML model.

In process A13, when the newly generated ML model is ready, the MTLF notifies the AnLF about the new ML model instance.

According to embodiment 2, the monitoring is triggered by the MTLF itself, and no coordination with AnLF is needed. That is, embodiment 2 describes MTLF-initiated accuracy monitoring.

Figure 5:
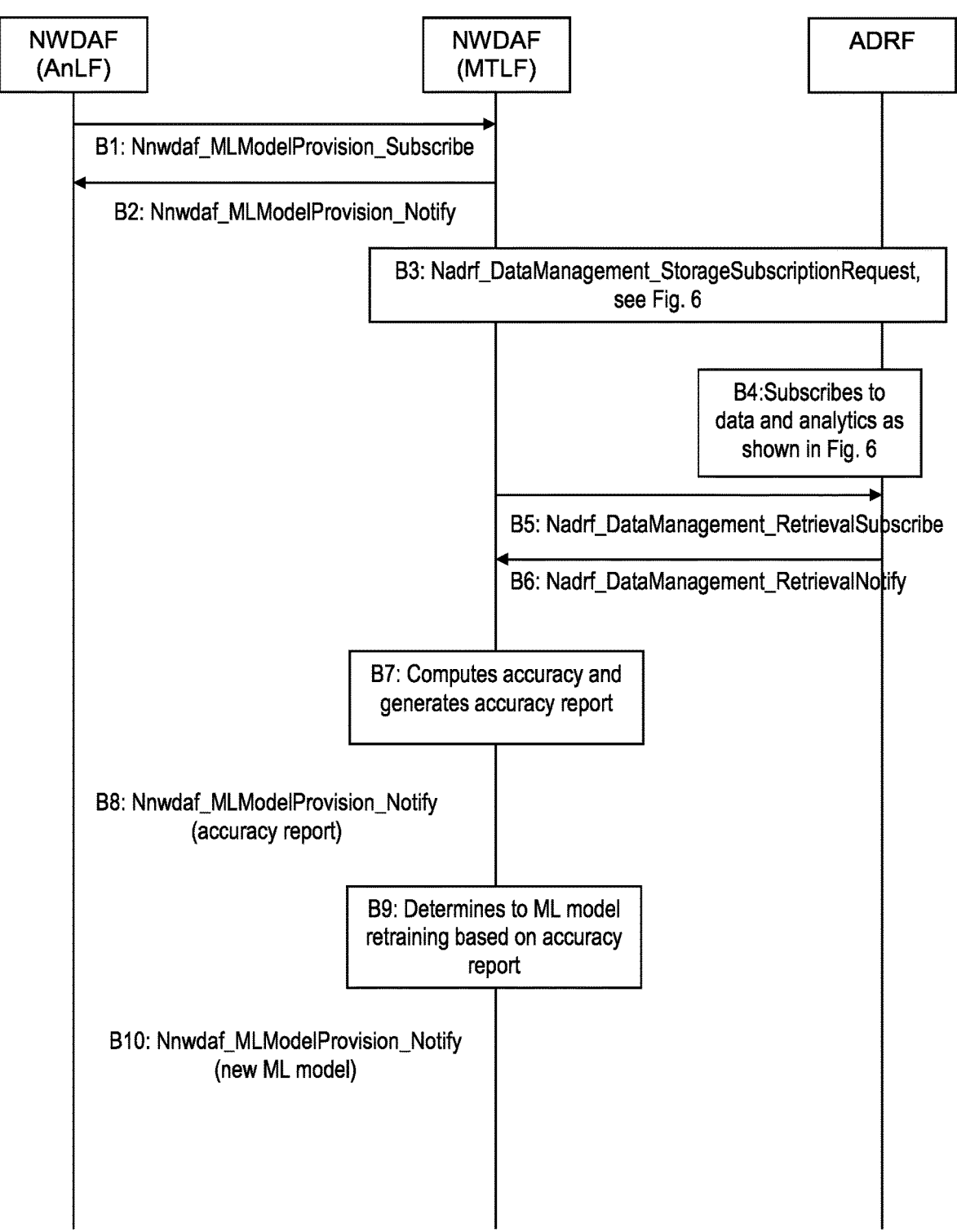
FIG. 5 illustrates a procedure for measuring and reporting accuracy of NWDAF analytics initiated by MTLF according to an embodiment 2.

FIG. 5 illustrates the procedure for measuring and reporting accuracy of NWDAF analytics initiated by MTLF according to embodiment 2.

In process B1, the AnLF (NWDAF containing AnLF) requests an ML model from the appropriate NWDAF containing MTLF.

In process B2, the MLTF (NWDAF containing MLTF) provides the ML model to the AnLF as per current specifications.

In process B3, the MLTF (NWDAF containing MTLF) requests ADRF to subscribe for the collection of the analytics and data that correspond to the analytics generated by the ML model provisioned in step 2. MTLF uses the procedures as described later in connection with FIG. 6 (i.e., procedures as defined in Clause 6.2B.3 of TS 23.288).

In process B4, the ADRF executes the procedures as described later in connection with FIG. 6 (as defined in Clause 6.2B.3 of TS 23.288) to subscribe to the analytics and data as requested by MTLF. ADRF stores the notifications.

In process B5, the NWDAF containing MLTF subscribes to ADRF to retrieve the analytics and data that correspond to the analytics generated by the ML model provisioned in step 2.

In process B6, the NWDAF containing MLTF receives the analytics and data from the ADRF.

In process B7, based on the collected analytics and data, the MLTF computes the accuracy using the predictions and the actual measured data observed at the time for which the prediction had been made.

In process B8, an accuracy report is sent to the AnLF after the events have occurred that were needed for the verification of the predictions. The accuracy report is sent in an MLModelProvision notification from MTLF.

In process B9, based on the computed accuracy, MLTF may decide to re-train the ML model.

In process B10, when the newly generated ML model is ready, the MTLF notifies the AnLF about the new ML model instance.

1. The solution according to both embodiments 1 and 2 has the following impacts:
2. The MTLF (i.e., NWDAF containing MTLF):
   generates accuracy reports to be sent to AnLF and analytics consumers, upon their request;
   NWDAF registers its measured accuracy (per Analytics ID) in its NF profile in NRF/UDM.
   Nnwdaf_AnalyticsSubscription service:
   _subscribe service operation includes an Accuracy Report Required flag and additional filter information related;
   _notify service operation includes the Accuracy Report.
   Nnwdaf_MLModelProvision service:
   _subscribe service operation includes the optional parameter MonitoringCorrelationID
   _notify service operation includes the Accuracy Report.
ADRF:
   Tags stored data using the MonitoringCorrelationID attribute
   Nadrf_DataManagement_StorageSubscriptionRequest service includes the MonitoringCorrelationID optional parameter
   Nadrf_DataManagement_RetrievalRequest service includes the MonitoringCorrelationID optional parameter.

Figure 6:
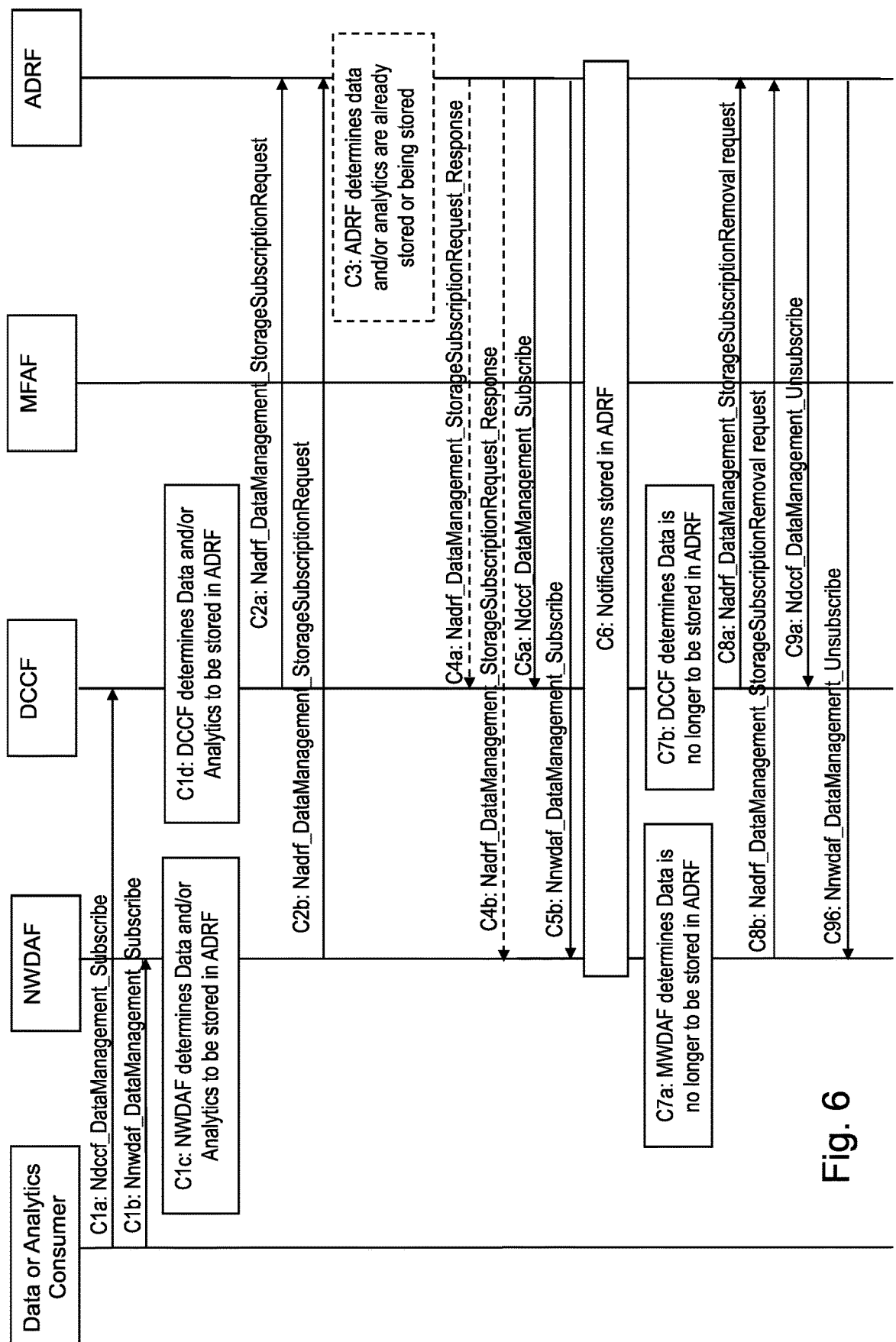
FIG. 6 illustrates historical data and analytics storage via notifications according to TS 23.288.

FIG. 6 represents FIG. 6.2B.3-1 of TS 23.288 V17.5.0 described in chapter 6.2B.3 and shows historical data and analytics storage via notifications. The procedures of FIG. 6 described in the following can be applied in the embodiments 1 and 2, as described above.

The procedure depicted in FIG. 6 is used by consumers (NWDAF, DCCF) to store received notifications in the ADRF. The consumer requests the ADRF to initiate a subscription for data and/or analytics. Data and/or analytics provided in notifications as a result of the subsequent subscription by the ADRF are stored in the ADRF.

In processes C1a-d, based on provisioning or based on reception of a DataManagement subscription request (e.g., see clause 6.2.6.3.2 of TS 23.288), the DCCF or the NWDAF determines that notifications are to be stored in an ADRF.

In processes C2a-b, the DCCF or the NWDAF determines the ADRF where data and/or analytics needs to be stored, and requests that the ADRF subscribes to receive notifications. The determination may be made based on configuration or information supplied by the data consumer as described in clauses 6.1.4 and 6.2.6.3 of TS 23.288. The request to the ADRF specifies the data and/or analytics to which the ADRF will subscribe by invoking the Nadrf-_DataManagement_StorageSubscriptionRequest service operation.

In process C3, optionally, the ADRF may, based on implementation, determine whether the same data and/or analytics is already stored or being stored, based on the information sent in process C2 by the consumer.

In process C4, optionally, if the data and/or analytics is already stored and/or being stored in the ADRF, the ADRF sends Nadrf_DataManagement_StorageSubscriptionRequest Response message to the consumer indicating that data and/or analytics is stored.

In processes C5a-b, ADRF subscribes to the DCCF or the NWDAF to receive notifications, providing its notification endpoint address and a notification correlation ID.

In process C6, the DCCF, the MFAF or the NWDAF sends Analytics or Data notifications containing the notification correlation ID provided by the ADRF to ADRF notification endpoint address. The ADRF stores the notifications.

In processes C7a-b, the DCCF or the NWDAF determines that notifications no longer need to be stored in the ADRF.

In processes C8a-b, the DCCF or the NWDAF requests that the ADRF unsubscribes to receive notifications.

In processes C9a-b, the ADRF sends a request to the DCCF or the NWDAF to unsubscribe to data notifications.

It is noted that the NWDAF may interact with the Data Source, and the DCCF may interact with the Data Source and/or MFAF. Delivery notifications from the DCCF/MFAF or NWDAF to the ADRF are subsequently halted.

The procedures of FIG. 6 which can be applied in embodiments 1 and 2 illustrated in FIGS. 4 and 5 can be in particular processes C2a-b, C4, C5a-b and C6.

Thus, according to some example embodiments (e.g., embodiments 1 and 2 described above, the MLTF executes the ML model monitoring, computes the accuracy of analytics and determines if ML model retraining is necessary. Depending on the use case, such operations may require high computational power and large storage space, and AnLF might not fulfil such requirements. Therefore, ADRF is used to store the analytics and data that MTLF uses to compute the accuracy.

According to the embodiment 1, the monitoring is triggered by AnLF, e.g., after receiving an analytics request from an Analytics consumer that requires also an accuracy report. In this embodiment, AnLF needs to coordinate the monitoring operations with the ADRF and MTLF.

According to embodiment 2 the monitoring is triggered by the MTLF itself, and no coordination with AnLF is needed.

Thus, according to several example embodiments, it is possible enhance the accuracy of the analytics prediction.

The above-described example embodiments are only examples and may be modified.

Names of network elements, protocols, and methods are based on current standards. In other versions or other technologies, the names of these network elements and/or protocols and/or methods may be different, as long as they provide a corresponding functionality.

In general, the example embodiments may be implemented by computer software stored in the memory (memory resources, memory circuitry) 12, 22, 32 and executable by the processor (processing resources, processing circuitry) 11, 21, 31 or by hardware, or by a combination of software and/or firmware and hardware.

As used in this application, the term "circuitry" refers to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term "means" in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

The memory (memory resources, memory circuitry) 12, 22, 32 may be of any type suitable to the local technical environment and may be implemented using any suitable data storage technology, such as semiconductor based memory devices, magnetic memory devices and systems, optical memory devices and systems, fixed memory and removable memory, and non-transitory computer-readable media. The processor (processing resources, processing circuitry) 11, 21, 31 may be of any type suitable to the local technical environment, and may include one or more of general purpose computers, special purpose computers, microprocessors, digital signal processors (DSPs) and processors based on a multi core processor architecture, as non-limiting examples.

It is to be understood that the above description is illustrative of the invention and is not to be construed as limiting the invention. Various modifications and applications may occur to those skilled in the art without departing from the true spirit and scope of the invention as defined by the appended claims.

We claim:

1. An apparatus comprising:

at least one processor; and at least one memory storing computer program code for a network data analytics function (NWDAF) containing machine learning model training logical function (MTLF), wherein the computer program code, when executed by the at least one processor, cause the apparatus at least to perform:

receiving, from a NWDAF containing an analytics logical function (AnLF), a request for a machine learning (ML) model, the request comprising a monitoring correlation identifier;

retrieving, from an analytics data repository function (ADRF) using the monitoring correlation identifier, analytics related information stored in the ADRF in association with the monitoring correlation identifier, the analytics related information including predictions provided by the ML model and measured data observed at times the predictions were made that are stored in the ADRF in association with the monitoring correlation identifier; and computing an accuracy of the predictions provided by the ML model comprised in the analytics related information that is retrieved, wherein an accuracy of the ML model is computed using the predictions and the measured data observed at the time the predictions were been made;

determining, based on the accuracy of the predictions provided by the ML model, whether the ML model is to be re-trained; and re-training the ML model based on determining that the ML model is to be re-trained.

2. The apparatus as claimed in claim 1, wherein the computer program code, when executed by the at least one processor, further causes the apparatus to perform:

providing the re-trained ML model to the NWDAF containing the AnLF.

3. The apparatus as claimed in claim 1, wherein the computer program code, when executed by the at least one processor, further causes the apparatus to perform:

creating an accuracy report based on or comprising the accuracy of predictions; and providing the accuracy report to the NWDAF containing the AnLF.

4. The apparatus as claimed in claim 1, wherein the computer program code, when executed by the at least one processor, further causes the apparatus to perform:

providing, to the NWDAF containing the AnLF, the ML model.

* * * * *